Feb. 18, 1969  W. P. DYKE ET AL  3,428,803
APPARATUS FOR SIMULTANEOUSLY PRODUCING X-RAY AND ELECTRON
RADIOGRAPHS OF THE SAME OBJECT
Filed Aug. 23, 1965

WALTER P. DYKE
FRANK J. GRUNDHAUSER
JOHN P. BARBOUR
INVENTORS

BY
BUCKHORN, BLORE, KLARQUIST & SPARKMAN
ATTORNEYS

United States Patent Office 3,428,803
Patented Feb. 18, 1969

3,428,803
APPARATUS FOR SIMULTANEOUSLY PRODUCING X-RAY AND ELECTRON RADIOGRAPHS OF THE SAME OBJECT
Walter P. Dyke, Frank J. Grundhauser, and John P. Barbour, McMinnville, Oreg., assignors to Field Emission Corporation, McMinnville, Oreg., a corporation of Oregon
Filed Aug. 23, 1965, Ser. No. 481,660
U.S. Cl. 250—65                                  8 Claims
Int. Cl. G01n 23/04; H01j 37/22; H05g 1/02

ABSTRACT OF THE DISCLOSURE

An apparatus for simultaneously producing an X-ray image and an electron image of the same object and recording such images, is described in which a portion of an electron beam bombards a target to produce X-rays and such X-rays, as well as another portion of the electron beam, are transmitted through the same portion of the object. The resulting composite radiograph including superimposed X-ray and electron images has high contrast and contains more information, such information being easy to interpret since the X-ray image and electron image coincide with each other in space and time. The electron beam source includes a pulsed electron radiation tube having a field emission cathode, while the X-ray emitting target is a plate positioned outside such tube and having a central aperture for passing the portion of the electron beam which penetrates the object.

---

The subject matter of the present invention relates generally to radiography and in particular to apparatus for simultaneously producing X-ray and electron images of the same object and recording such images on a suitable detector. The X-ray and the electron radiographs are superimposed so that although they may be formed on different radiation sensitive films these films may be overlaid to give a composite radiograph, which is relatively simple to interpret.

The radiographic apparatus of the present invention is especially useful in producing radiographs of objects of different atomic number materials having a wide range of densities or thicknesses. The term "radiograph" as used herein refers to a picture produced on any radiation sensitive surface by X-rays or electrons, including a fluorescent screen, an image intensier tube, as well as films. The present apparatus has several advantages over that previously employed and produces radiographs having a much greater contrast range. Another advantage of the present invention is that it employs a single electron source to form both the electron image and the X-ray image by converting a portion of the electrons into X-rays before irradiating the object. This enables the X-rays and electrons to pass through the same portion of the object in substantially the same direction, so that the images produced thereby coincide with each other both in space and time, thereby greatly simplifying the interpretation of the information contained in the resulting radiographs.

In addition, the radiographic apparatus of the present invention is much simpler and less expensive than systems employing separate sources of X-rays and electrons since, among other things, it enables the use of a single electron radiation tube connected to a single high voltage pulse generator. As a result of employing a common source of X-rays and electrons there is no parallax distortion between the X-ray image and the electron image as there is when two separate spaced sources of X-rays and electrons are used. Furthermore, by employing an external X-ray target positioned outside of an electron radiation tube to produce the X-rays the present apparatus is more versatile since such target can be replaced when it is damaged or when other target materials are desired, as well as allowing electron pulses of higher energy to be focused on a smaller area of such target.

It is therefore one object of the present invention to provide an improved apparatus for simultaneously producing an X-ray image and an electron image of the same object from a common source of radiation to prevent parallax image distortion.

Another object of the invention is to provide an apparatus capable of producing radiographs of greater contrast range to enable radiography of objects having a wide range of materials of different atomic numbers, densities, or thicknesses.

Another object of the present invention is to provide an improved radiographic apparatus for simultaneously producing X-ray and electron radiographs of the same object so that the X-ray radiograph and the electron radiograph coincide in position and time for easier interpretation of the information contained thereon.

A further object of the invention is to provide an improved radiographic apparatus for simultaneously producing X-ray and electron radiographs of the same object by an apparatus which is relatively simple and inexpensive.

An additional object of the present invention is to provide an improved radiographic apparatus capable of operation at extremely high speeds and producing pulses of X-rays and electrons of extremely high intensity, such apparatus having a long useful lifetime and a greater versatility by employing an electron radiation tube with a field emission cathode structure including a plurality of pointed emitting elements and a replaceable X-ray target outside of such tube.

Other objects and advantages will be apparent from the following detailed description of certain preferred embodiments thereof and from the attached drawings of which:

Figure 1:
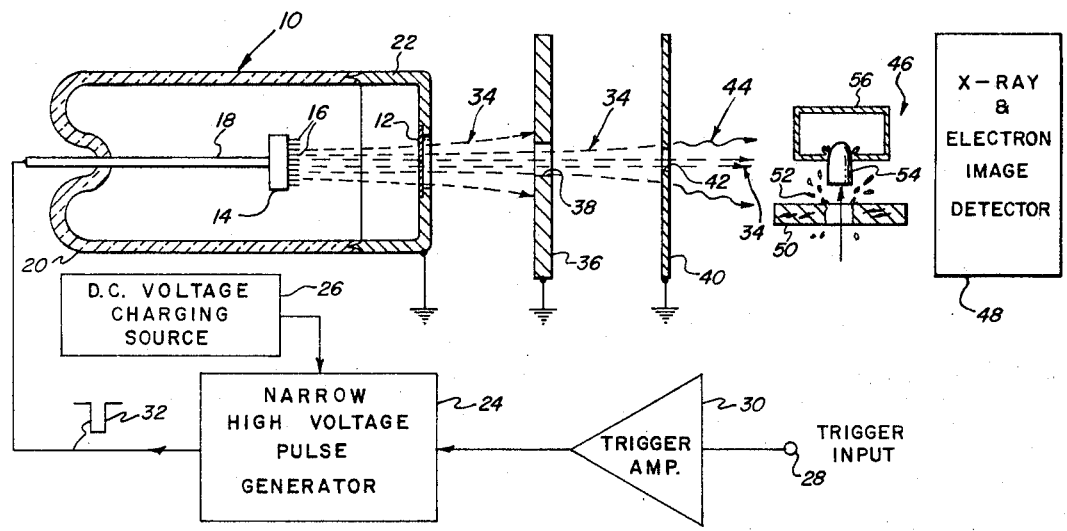
FIG. 1 is a schematic diagram of one embodiment of the radiographic apparatus of the present invention.
Figure 4:
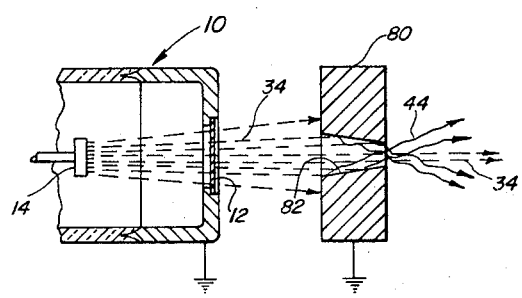
FIG. 4 is a schematic diagram of a portion of a third embodiment of the present radiographic apparatus including a reflection type of X-ray target.

As shown in FIG. 1, one embodiment of the present invention includes an electron radiation tube 10 similar to that shown in FIG. 4 of U.S. Patent 3,173,006, issued Mar. 9, 1965 to W. P. Dyke et al. which is provided with an electron transparent anode window 12 that is a thin metal foil. The anode window forms part of the evacuated envelope of such tube and transmits the electrons emitted by a field emission cathode structure 14 within such envelope, out of such tube. The field emission cathode structure 14 includes a plurality of spaced pointed emitting elements 16, which may be in the form of needles each having one end embedded within a common support block of copper or other suitable metal and having its pointed end directed toward the anode window 12 and uniformly spaced therefrom. The cathode structure 14 is attached to the end of a support rod 18 which extends through a reentrant portion at one end of a glass envelope section 20, which is sealed to such support rod and to a metal support cup 22 forming another part of such envelope by vacuum tight glass-to-metal seals. The support cup 22 is secured to the anode window 12 by welding or the like to form another vacuum tight seal.

The anode window 12 and support cup 22 may be electrically grounded while the field emission cathode support rod 18 is connected to the output of a high voltage pulse generator 24. The pulse generator may be a Marx surge generator employing lumped constant artificial transmission lines of substantially the same uniform characteristic impedance to store the current supplied to such pulse generator by a D.C. voltage source 26 connected to such pulse generator. The transmission lines within the pulse generator 24 are charged in parallel through isolating inductances and discharged in series through spark gaps in a similar manner to that disclosed in copending U.S. Patent 3,256,439, filed Dec. 17, 1962 by W. P. Dyke et al. The pulse generator 24 is triggered by a trigger pulse applied to the input terminal 28 of a trigger amplifier circuit 30 whose output is connected to an auxiliary electrode in one of the spark gaps of such pulser to cause all of such spark gaps to break down, in the manner described in the above-mentioned patent. This produces a narrow, negative rectangular pulse 32 of high current and high voltage at the output of such pulse generator. Alternatively, the output of the trigger amplifier may be connected to an external spark gap which forms no part of the pulse generator and emits ultraviolet light or other ionizing radiation that causes the spark gaps of the pulse generator to break down substantially simultaneously when they are positioned in a common light path.

The negative voltage output pulse 32 of the high voltage pulse generator 24 is applied to the field emission cathode of tube 10 and the resulting high electrical field produced adjacent the points of the emitting elements 16 due to their small radii of curvature of about $10^{-5}$ centimeter, causes electrons to be emitted from at least some of such elements. The high current flowing through the emitting elements melts and vaporizes a portion of such elements to produce positive ions of cathode metal which greatly increase the current flow from the field emission cathode through the anode window 12 by producing a vacuum arc between these members. As a result of this vacuum arc operation the current flow is increased to several thousand amperes for the brief time of the width of the rectangular output voltage pulse 32 which may be about .05 microsecond. This extremely high current is believed to be caused by positive ions of cathode metal neutralizing the negative space charge which ordinarily surrounds the field emission cathode elements 16. It should be noted that a large number of field emission cathode emitting elements 16 are employed to provide the electron radiation tube with a long useful lifetime because only a few of such elements are melted and vaporized for each pulse.

The electrons 34 transmitted through the anode window 12 of tube 10 may be apertured by a collimator or beam limiting electrode 36 into an electron beam of small diameter by transmitting a portion of such electrons through a circular aperture 38 extending through such collimator electrode before such electrons are caused to strike an external X-ray target 40. The X-ray target may be of the X-ray transmission type also having a circular aperture 42 to enable some of the electrons to be transmitted through such aperture without converting them into X-rays. Another portion of the electrons is caused to bombard the rear surface of such target adjacent the electron tube in the area surrounding the aperture 42 in order to emit X-rays 22 from the front surface on the opposite side of such target. Both the collimator electrode 36 and the X-ray target 40 may be grounded to enable the electrons to pass through their apertures and to eliminate any shock hazard to personnel operating the apparatus since such target and such collimator are positioned outside of the electron radiation tube.

The X-ray target 40 may be replaced by targets of many different materials and thicknesses and the diameter of the aperture 42 may be varied to control the amount of electrons transmitted therethrough. However, in one example the target was made of a tungsten plate having a thickness of .002 inch and an aperture 42 of 1 millimeter in diameter. Since it is desirable to prevent the collimator electrode 36 from emitting X-rays it should ordinarily be constructed of a material of low atomic number such as beryllium, carbon, or aluminum. Of course the X-ray target should be made of a high atomic number material for most efficient production of X-rays and may be formed of lead or uranium as well as tungsten. The beam of combined X-ray and electron radiation transmitted from the target 40 is caused to pass through an object 46 under investigation before striking a detector 48 which is sensitive to both the X-ray image and the electron image formed of such object by such beam of combined radiation. The X-ray and electron image detector 48 may be an electronic image intensifier tube, a fluorescent screen which is sensitive to both X-rays and electrons, and many other types of recording devices. However, for best image resolution a radiographic film type detector is employed.

The object 46 may include members composed of materials of different atomic number, different thicknesses and different density, so that the electrons are partially absorbed by some members which transmit the X-rays without any appreciable absorption such as a wood plate 50 and the gas and wood particles 52 produced when a bullet 54 is fired through such wood plate. In addition, the object under investigation may contain a member, such as a hollow aluminum container 56, whose internal structure is of interest when it is pierced by the bullet but which is of a material which prevents the passage of electrons so that X-rays must be employed to record such internal structure. Thus a beam of combined X-ray and electron radiation enables the production of radiographs on detector 48 having a much wider contrast range than that produced by either X-rays or electrons alone.

Figure 2A:
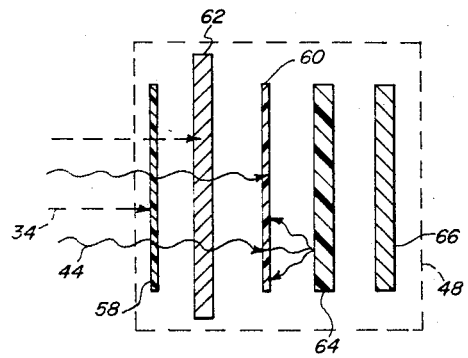
FIGS. 2A and 2B are schematic sectional views of two different embodiments of the X-ray and electron image detector in the apparatus of FIG. 1.
Figure 2B:
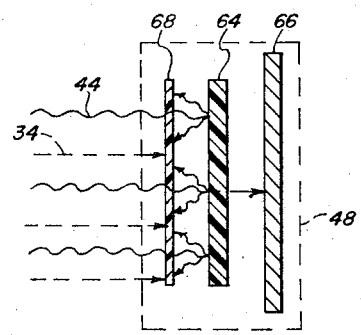

Two different embodiments of a radiographic film detectors are shown in FIGS. 2A and 2B which can be employed for detector 48 in FIG. 1. The detector of FIG. 2A includes an electron sensitive film 58 and a separate X-ray sensitive film 60 which may be spaced from such electron film by an electron shield 62 of low atomic number material such as aluminum that prevents any electrons from reaching the X-ray film. In addition, an X-ray sensitive fluorescent screen 64 may be provided on one or both sides of the X-ray film 60 to function as an image intensifier screen for the X-ray image recorded on such film. It should be noted that the X-ray film 60 might actually be sensitive only to the visual light output of fluorescent screen 64 and still record the X-ray image of the object under investigation because such X-ray image would be converted to a light image by the fluorescent screen. While it is not essential, it may sometimes be desirable to provide an X-ray shield plate 66 within the detector to prevent any radiation hazard to the operator of the apparatus; such X-ray shield may be in the form of a lead plate.

Another embodiment of a radiographic film detector which can be used as the detector 48 in the apparatus of the present invention is shown in FIG. 2B. This detector is different from that of FIG. 2A in that a single radiation sensitive film 68 is employed to record both the electron image and the X-ray image so that such images are superimposed on the same film. In addition it may also be desirable to employ a fluorescent image intensifying screen 64 and X-ray shield 66 in the detector of FIG. 2B, in which case the film 68 can be of the type that is sensitive to electrons and visible light. It should be noted that film 68 will record both the X-ray image and the electron image if neither the X-rays nor the electrons totally expose such film to saturation. Thus, when employing the film detector of FIG. 2A, the proportion of electrons and X-rays emitted from the X-ray target, as well as the intensity of such radiation which is determined by the voltage and current of the output pulse of the high voltage pulser 24, must be controlled more carefully. While many types of radiation sensitive films may be employed, the film sold under the trade name "Kodak Type R" has been used successfully for the electron sensitive film 58 and the film sold under the trade name "Kodak Royal Blue" has been used for the X-ray film 60 in the embodiment of FIG. 2A. In addition it has been found that by employing an electron film 58 of a different color than the X-ray film 60, it is possible to take a photograph of the two superimposed radiographic negatives on a single technicolor film and still distiguish the X-ray image from the electron image. This provides a single composite radiograph of somewhat greater contrast than that of FIG. 2B.

Figure 5A:
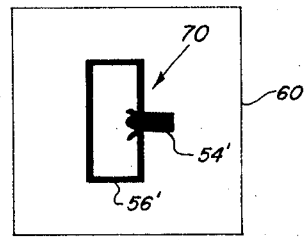
FIGS. 5A and 5B show, respectively, an X-ray radiograph and an electron radiograph produced by the apparatus of the present invention using an image detector similar to that of FIG. 2A.
Figure 5B:
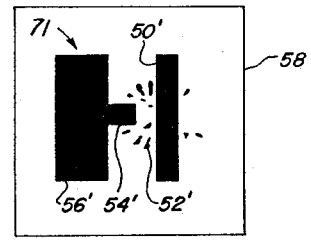

When the radiographic film detector of FIG. 2A is employed, an X-ray image 70 is recorded on film 60, as shown in FIG. 5A, and electron image 61 is formed on the film 58, as shown in FIG. 5B. It can be seen from FIG. 5A that the X-ray radiograph shows a bullet image 54' and a hollow container image 56' but does not show an image of either the wood panel or the wood particles and gas. However, the electron radiograph on film 58 does show a wood panel image 50' and a wood particle and gas image 52' in addition to the outline of the bullet 54' and metal container 56' but does not disclose the internal structure of such container in the manner of the X-ray radiograph. In order to form a composite X-ray and electron radiograph of the object under investigation it is only necessary to overlay the X-ray film negative 60 and the electron film negative 58 since both the X-ray and electron radiographs were produced simultaneously by radiation emitted from a common source and transmitted in the same direction to the object under investigation. This considerably simplifies interpretation of the information contained on the radiograph.

Figure 3:
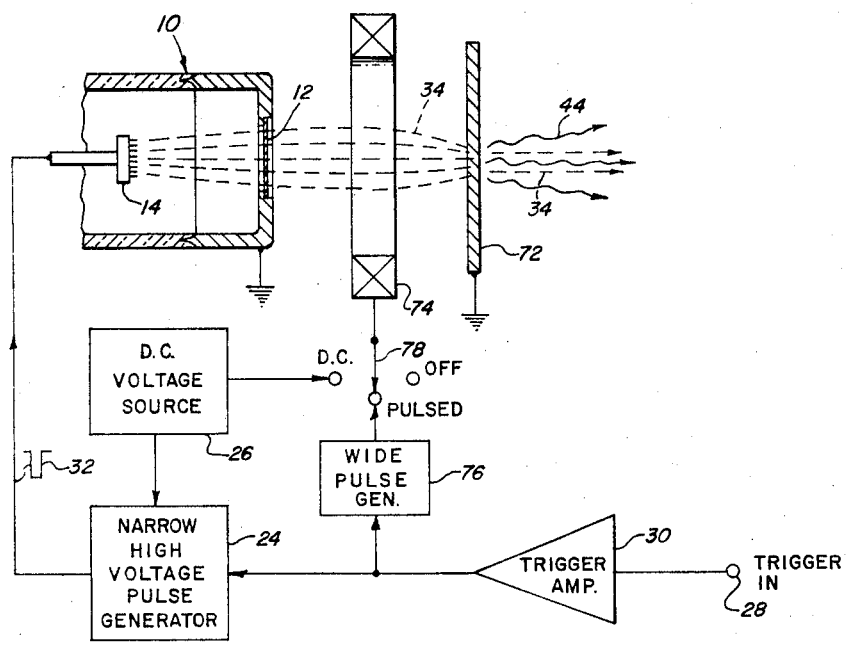
FIG. 3 is a schematic diagram of a portion of another embodiment of the radiographic apparatus of the present invention employing a different type of electron focusing means and a different type of X-ray target than that in FIG. 1.

Another embodiment of the radiographic apparatus of the present invention is shown in FIG. 3 and is similar to that of FIG. 1 except that an unapertured X-ray target 72 is employed in place of the target 40, such unapertured target being a thin, metal film to enable the transmission of electrons therethrough as well as the emission of X-rays. It should be noted that it is also possible to employ the anode window 12 of the electron radiation tube 10 as a transmission type X-ray target similar to that of target 72. However, this is usually undesirable because when the electron beam is focused onto a small area of such anode window, the window is usually punctured and destroyed after a few pulses, which would reduce the lifetime of the tube 10 considerably. An electromagnetic focusing coil 74 may be employed between the X-ray target 72 and the electron radiation tube 10 in order to focus the electrons 34 onto a small area of such target after they leave the anode window of such tube. This electromagnetic focusing coil may be connected to a D.C. voltage source such as the source 26 of charging current employed for the pulse generator 24. However such focusing coil may also be pulsed in synchronism with the pulsed operation of electron radiation tube 10 by connecting such coil to a separate pulse generator 76 which is triggered by the same trigger pulse that triggers the high voltage pulse generator 24 but produces an output pulse of somewhat reduced voltage and greater width. This requires less power than a D.C. voltage operated focusing coil. Either a D.C. or pulsed operation can be employed for the focusing coil 72 by providing a selector switch 78 whose movable contact is connected to such coil and whose fixed contacts are respectively connected to the D.C. voltage source 26, to the pulse generator 76 and to an unconnected or grounded terminal in the "Off" position of such switch.

Of course the electromagnetic focusing coil 74 of FIG. 3 can be employed with the apertured X-ray target 40 of FIG. 1 in place of the collimator electrode 36, and such collimator electrode can be used in place of the focusing coil with the unapertured target electrode 72. In addition, it is possible to eliminate both the collimator electrode and the electromagnetic focusing coil when the object is positioned near the electron radiation tube. In this regard it should be noted that the electrons emitted by the electron tube 10 are scattered by air to some extent so that it may be desirable to enclose the electron tube, the focusing means, the X-ray target, the object under investigation, and the detector within an evacuated chamber of relatively low vacuum, or to increase the voltage of the output pulse 32 of the pulse generator 24 to a voltage in the neighborhood of 600 to 2000 kilovolts when the object is positioned several feet from the tube. When an evacuated chamber at about $10^{-1}$ torr pressure is employed, a pulse on the order of 200 to 300 kilovolts is sufficient.

Another embodiment of an X-ray target which may be used in the apparatus of the present invention is shown in FIG. 4 to be a reflection type X-ray target 80 having a fustro-conical passageway 82 therethrough whose larger opening faces the electron radiation tube 10 and whose smaller opening faces the object under investigation. This enables the electrons 34 emitted by the tube 10 to enter the large end of the conical passageway 82 and strike the inner surface of the passageway to emit X-rays from such surface which are transmitted out of the opening at the small end of such passageway. In addition, some of the electrons 34 are transmitted completely through the passageway 82 in the X-ray target 80 without striking such target so that a beam of combined X-ray and electron radiation is transmitted through the object from a common source. It should be noted that the X-ray target 80 also functions in a similar manner to the collimator electrode 36 of FIG. 1 in that it limits the diameter of the output beam transmitted from the X-ray target. Therefore it is possible to employ X-ray target 80 without using such collimator electrode or an electromagnetic focusing coil.

It will be obvious to those having ordinary skill in the art that many changes may be made in the details of the above described preferred embodiments of the present invention. For example, a cineradiographic system can be provided by employing a plurality of high voltage pulse generators connected to a single electron radiation tube by field emission rectifier switches in the manner of co-pending U.S. patent application Ser. No. 427,653, filed Jan. 25, 1965 by J. P. Barbour, now U.S. Patent 3,363,102. Therefore the scope of the present invention should only be determined by the following claims.

We claim:
1. Apparatus for simultaneously producing X-ray and electron images of the same object, comprising:
   electron source means including an electron tube, for producing a beam of electrons;
   image detector means sensitive to both X-ray images and electron images; and
   target means supported between said electron source means and said detector means, for converting a portion of said electrons into X-rays and for transmitting at least a portion of said X-rays and a portion of said electron beam to said detector means so that said X-rays and said electron beam pass through substantially the same portion of an object positioned between said target means and said detector means to produce an X-ray image and an electron image of said object on said detector means simultaneously.
2. Apparatus for simultaneously producing X-ray and electron radiographs of the same object, comprising:
   electron source means including an electron tube, for producing a narrow beam of electrons;

image detector means including at least one radiation sensitive film, for recording both X-ray and electron images as X-ray and electron radiographs; and target means supported between said electron source means and said detector means, for emitting X-rays in response to bombardment of said target means by said electron beam and for transmitting at least a portion of said X-rays and a portion of said electron beam to the film of said detector means so that said X-rays and said electron beam pass in substantially the same direction through substantially the same portion of an object positioned between said target means and said detector means to produce an X-ray image and an electron image of said object on the film of said detector means simultaneously.

3. Apparatus for simultaneously producing X-ray and electron images of the same object, comprising:

electron source means including an electron tube having a field emission cathode, for generating a beam of electrons;

high voltage pulser means for applying pulses of high voltage and high current to said electron source means to cause said cathode to emit electrons;

image detector means sensitive to both X-ray images and electron images; and target means supported between said electron source means and said detector means, for emitting X-rays in response to bombardment of said target means by said electron beam and for transmitting at least a portion of said X-rays and a portion of said electron beam to said detector means so that said X-rays and said electron beam pass through an object positioned between said target means and said detector means to produce an X-ray image and an electron image of said object on said detector means simultaneously.

4. Apparatus for simultaneously producing X-ray and electron radiographs of the same object, comprising:

electron source means including an electron discharge device, for generating a beam of electrons;

image detector means sensitive to both X-ray and electron images as X-ray and electron radiographs; and target means including an X-ray target member having an aperture therethrough supported between said electron source means and said detector means, for emitting X-rays in response to bombardment of said target means by said electron beam and for transmitting at least a portion of said electron beam through said aperture to provide a combined beam of X-rays and electrons which is transmitted to said detector means so that said X-rays and said electron beam pass in substantially the same direction through substantially the same portion of an object positioned between said target means and said detector means to produce an X-ray image and an electron image of said object on said detector means simultaneously.

5. Radiographic apparatus, comprising:

an electron radiation tube having an evacuated envelope containing a field emission cathode structure with a plurality of spaced, pointed emitting elements and an electron transparent anode forming a portion of the envelope of said tube to transmit electrons emitted by said cathode structure through said anode and out of said tube;

an external X-ray target supported outside of said tube adjacent said anode in position to be bombarded by at least a portion of the electrons transmitted through said anode for the emission of X-rays from said target, and for transmitting another portion of said electrons through said target in substantially the same direction as said X-rays;

pulser means for applying narrow high voltage pulses between said field emission cathode structure and said anode to cause said electrons to be emitted from said pointed emitting elements in short pulses; and radiographic image means spaced from said target for producing radiographs of both an X-ray image and an electron image of substantially the same portion of an object positioned between said target and said radiographic means in the path of said X-rays and said electrons, said images being formed by absorption of a portion of said X-rays and said electrons by said object.

6. Radiographic apparatus comprising:

an electron radiation tube having an evacuated envelope containing a field emission cathode structure with a plurality of spaced, pointed emitting elements and an electron transparent anode forming a portion of the envelope of said tube to transmit electrons emitted by said cathode structure through said anode and out of said tube;

an external X-ray target supported outside of said tube adjacent said anode in position to be bombarded by at least a portion of the electrons transmitted through said anode for the emission of X-rays from said target, and for transmitting another portion of said electrons through said target in substantially the same direction as said X-rays;

pulser means for applying narrow rectangular high voltage, high current pulses between said field emission cathode structure and said anode to cause said electrons to be emitted by field emission from said pointed emitting elements in short pulses, and to cause at least a portion of said elements to be vaporized for each pulse to produce a vacuum arc between said cathode structure and said anode; and radiographic image means spaced from said target for producing radiographs of both an X-ray image and an electron image of an object positioned between said target and said radiographic means in the path of said X-rays and said electrons, said images being formed by absorption of a portion of said X-rays and said electrons by said object, and said radiographic means including at least two separate photosensitive films for recording the electron image on one film and the X-ray image on another film.

7. Radiographic apparatus, comprising:

an electron radiation tube having an evacuated envelope containing a field emission cathode structure with a plurality of spaced, pointed emitting elements and an electron transparent anode forming a portion of the envelope of said tube to transmit electrons emitted by said cathode structure through said anode and out of said tube;

an external X-ray target of high atomic number material supported outside of said tube adjacent said anode in position to be bombarded by at least a portion of the electrons transmitted through said anode for the emission of X-rays from said target, and for transmitting another portion of said electrons through said target in substantially the same direction as said X-rays;

a collimator electrode of low atomic number material supported between said X-ray target and said tube and having a small aperture for transmission of said electrons through said collimator electrode to form a narrow electron beam which bombards said target;

pulser means for applying narrow rectangular high voltage, high current pulses between said cathode structure and said anode to cause said electrons to be emitted by field emission from said pointed emitting elements in short pulses; and radiographic image means spaced from said target for producing radiographs of both an X-ray image and an electron image of an object positioned between said target and said radiographic means in the path of said X-rays and said electrons, said images being formed by absorption of a portion of said X-rays and said electrons by said object, and said radiographic means including at least two separate photosensitive films for recording the electron image on one film and the X-ray image on another film.

8. Radiographic apparatus, comprising:

an electron radiation tube having an evacuated envelope containing a field emission cathode structure with a plurality of spaced, pointed emitting elements and an electron transparent anode forming a portion of the envelope of said tube to transmit electrons emitted by said cathode structure through said anode and out of said tube;

an external X-ray target supported outside of said tube adjacent said anode in position to be bombarded by at least a portion of the electrons transmitted through said anode for the emission of X-rays from said target, said target having an aperture therethrough for transmitting another portion of said electrons through said target in substantially the same direction as said X-rays;

an electromagnetic focusing coil supported between said X-ray target and said tube for focusing said electrons into a narrow electron beam;

pulser means for applying narrow rectangular high voltage, high current pulses between said field emission cathode structure and said anode to cause said electrons to be emitted by field emission from said pointed emitting elements in short pulses and to cause at least a portion of said elements to be vaporized for each pulse to produce a vacuum arc between said cathode structure and said anode; and radiographic image means spaced from said target for producing radiographs of both an X-ray image and an electron image of an object positioned between said target and said radiographic means in the path of said X-rays and said electrons, said images being formed by absorption of a portion of said X-rays and said electrons by said object, and said radiographic means including at least two separate photosensitive films for recording the electron image on one film and the X-ray image on another film.

References Cited

UNITED STATES PATENTS

| | | | |
|---|---|---|---|
| 2,297,416 | 9/1942 | Kallman | 250—65 |
| 2,707,237 | 4/1955 | Shurcliff | 250—65 X |
| 2,964,631 | 12/1960 | Foster | 250—83.3 |
| 3,087,061 | 4/1963 | Dukes et al. | 250—83.3 |
| 3,173,006 | 3/1965 | Dyke et al. | 250—49.5 |
| 3,246,146 | 4/1966 | Cohen et al. | 250—49.5 |

WILLIAM F. LINDQUIST, *Primary Examiner.*

U.S. Cl. X.R.

250—49.5, 53